(12) United States Patent
Dole et al.

(10) Patent No.: US 6,179,347 B1
(45) Date of Patent: Jan. 30, 2001

(54) SNAP-ACTION PIPE COUPLING RETAINER WITH A RHOMBOIDAL CROSS-SECTION

(75) Inventors: Douglas R. Dole, Whitehouse Station, NJ (US); Mark J. Sewell, Bethlehem, PA (US)

(73) Assignee: Victaulic Company of America, Easton, PA (US)

( * ) Notice: Under 35 U.S.C. 154(b), the term of this patent shall be extended for 0 days.

(21) Appl. No.: 09/009,528

(22) Filed: Jan. 20, 1998

Related U.S. Application Data

(63) Continuation-in-part of application No. 08/665,477, filed on Jun. 18, 1996, now Pat. No. 5,813,705.

(51) Int. Cl.⁷ ............................................. F16L 37/14
(52) U.S. Cl. ............................ 285/321; 285/340; 285/305
(58) Field of Search ..................................... 285/305, 340, 285/104, 308, 321; 403/14, 318, 326

(56) References Cited

U.S. PATENT DOCUMENTS

| | | | |
|---|---|---|---|
| 1,995,006 | 3/1935 | Mueller et al. | 285/321 |
| 2,005,174 | 6/1935 | Williams | 247/27 |
| 2,458,714 | 1/1949 | Mahoney | 285/97.3 |
| 2,597,482 | 5/1952 | Harrison et al. | 285/97.3 |
| 2,785,910 | 3/1957 | Munger | 285/305 |
| 2,831,711 | 4/1958 | Leadbetter | 285/238 |
| 2,950,132 | 8/1960 | Kocsuta | 285/307 |
| 3,181,897 | 5/1965 | Krayenbuhl | 285/305 |
| 3,334,929 | 8/1967 | Wiltse | 285/305 |
| 3,389,923 | 6/1968 | Love, jr. et al. | 285/321 |
| 3,422,630 | 1/1969 | Marier | 61/53 |
| 3,606,402 | 9/1971 | Medney | 285/305 |
| 3,822,074 | 7/1974 | Welcker | 285/305 |
| 4,072,328 | 2/1978 | Elliott | 285/340 |
| 4,105,226 | 8/1978 | Frey et al. | 285/319 |
| 4,111,464 | 9/1978 | Asano et al. | 285/111 |
| 4,181,329 | 1/1980 | Helm | 285/340 |
| 4,269,436 | 5/1981 | Medney | 285/305 |
| 4,293,148 | 10/1981 | Milberger | 285/305 |
| 4,396,210 | 8/1983 | Spencer, III et al. | 285/305 |
| 4,697,947 | 10/1987 | Bauer et al. | 403/14 |
| 4,810,009 | 3/1989 | Legris | 285/340 |
| 4,927,192 | 5/1990 | Ungchusri et al. | 285/305 |
| 5,040,831 | 8/1991 | Lewis | 285/305 |
| 5,160,179 | 11/1992 | Takagi | 285/340 |
| 5,176,413 | * 1/1993 | Westman | 285/321 |
| 5,496,076 | 3/1996 | Lin | 285/340 |
| 5,511,826 | 4/1996 | Clare et al. | 285/5 |
| 5,603,532 | 2/1997 | Guest | 285/305 |

FOREIGN PATENT DOCUMENTS

| | | | |
|---|---|---|---|
| 654535 | 11/1963 | (BE) | 285/321 |
| 417246 | 1/1967 | (CH) . | |
| 225305 | 10/1987 | (EP) . | |
| 1310712 | 10/1962 | (FR) . | |
| 1277385 | 6/1972 | (GB) . | |
| 2034841 | 6/1980 | (GB) . | |
| 9006468 | 6/1990 | (WO) | 285/321 |

* cited by examiner

Primary Examiner—Eric K. Nicholson
(74) Attorney, Agent, or Firm—Abelman, Frayne & Schwab

(57) ABSTRACT

A pipe coupling includes tubular body and a retainer having a continuous strap-like base band and a plurality of spring fingers that extend inwardly therefrom into the inner periphery of the body, and which are cammed outwardly by a pipe when inserted into the coupling, the spring fingers then returning to their original position under the stored spring force for them to snap into a groove in the pipe exterior, and thus provide a positive stop preventing withdrawal of the pipe axially of the coupling. The spring fingers have a generally frusto-conical configuration. In an improved embodiment, the retainer is configured as a single continuous strap-like member having a generally rhomboidal cross-sectional configuration at substantially all cross-sections therearound, and is devoid of the spring fingers and base retainer portion disclosed in the previous embodiments.

53 Claims, 6 Drawing Sheets

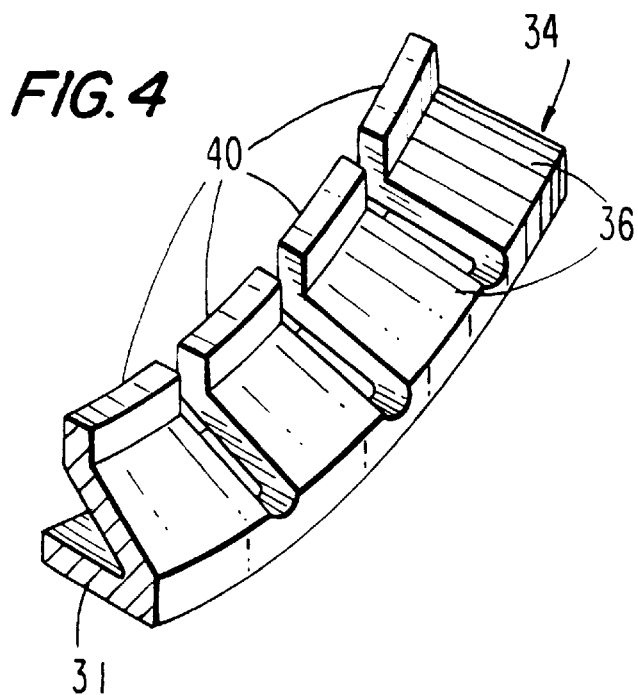
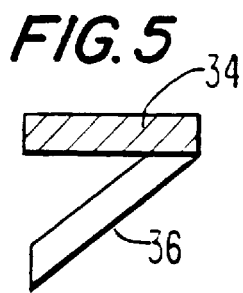
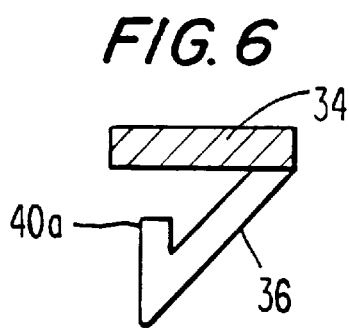
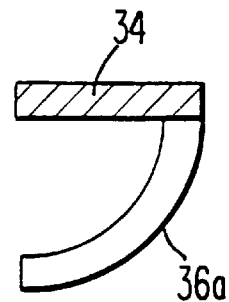

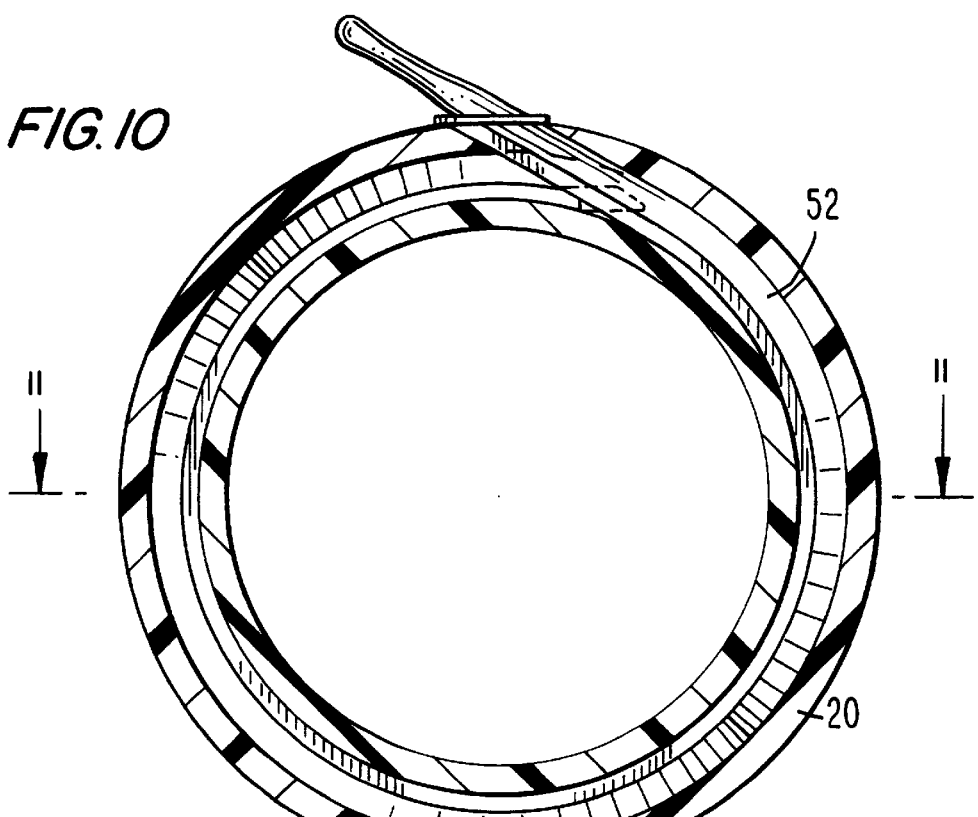
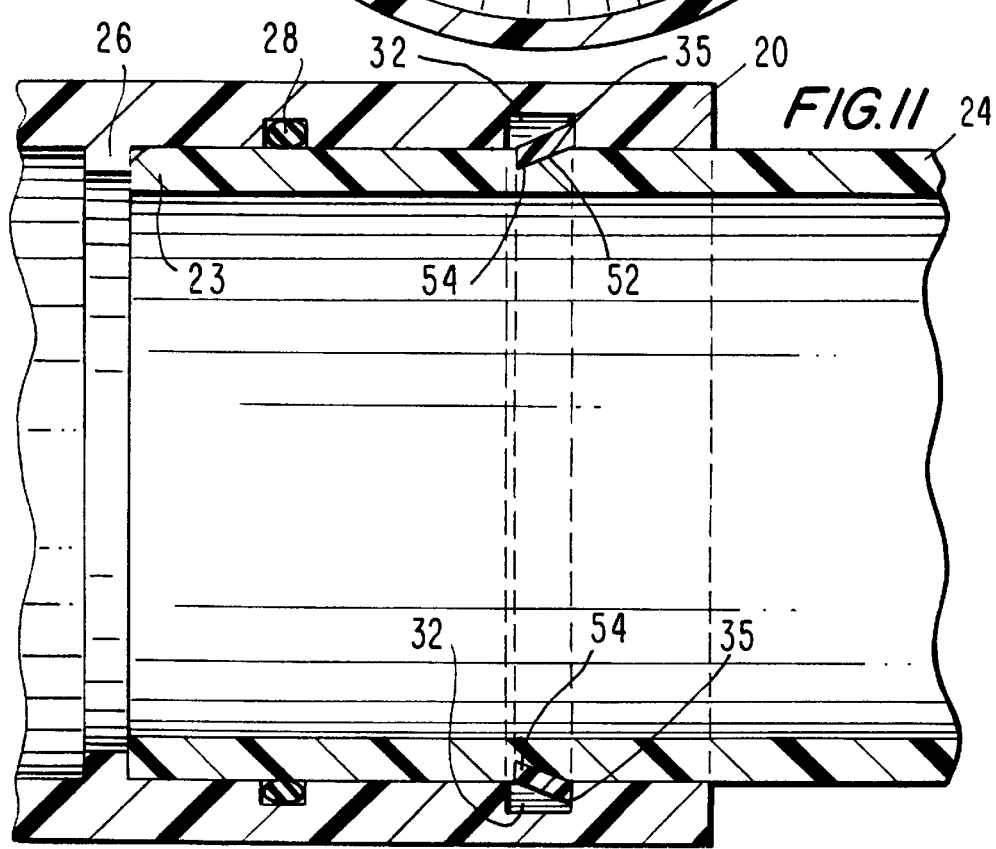

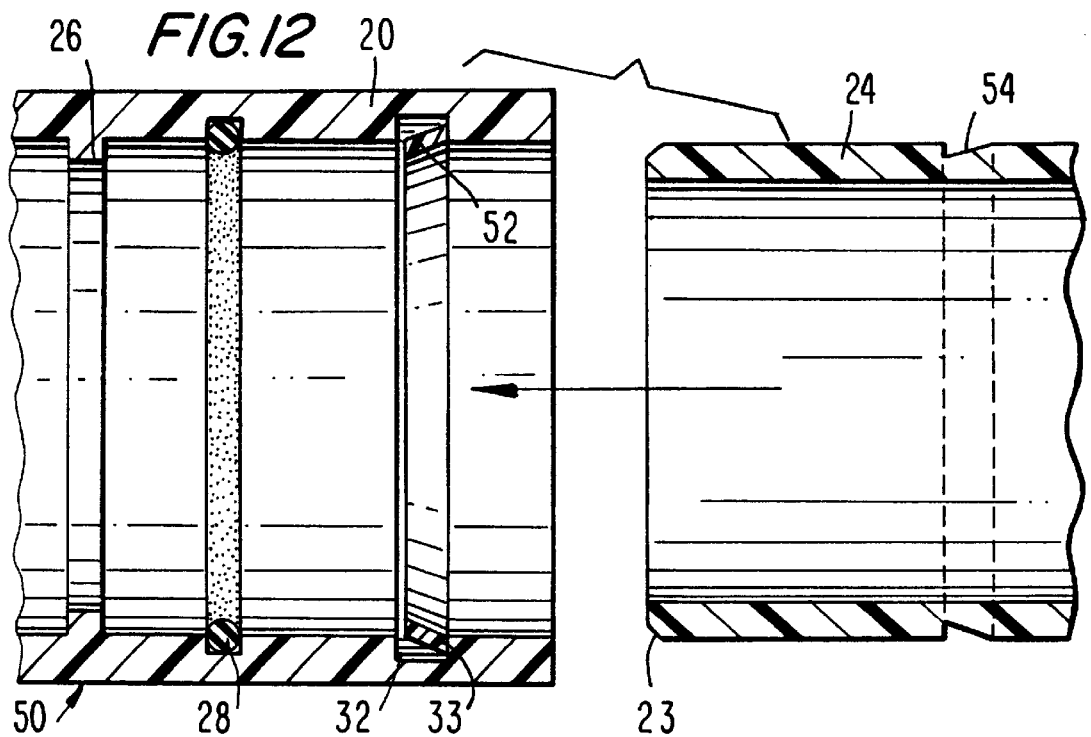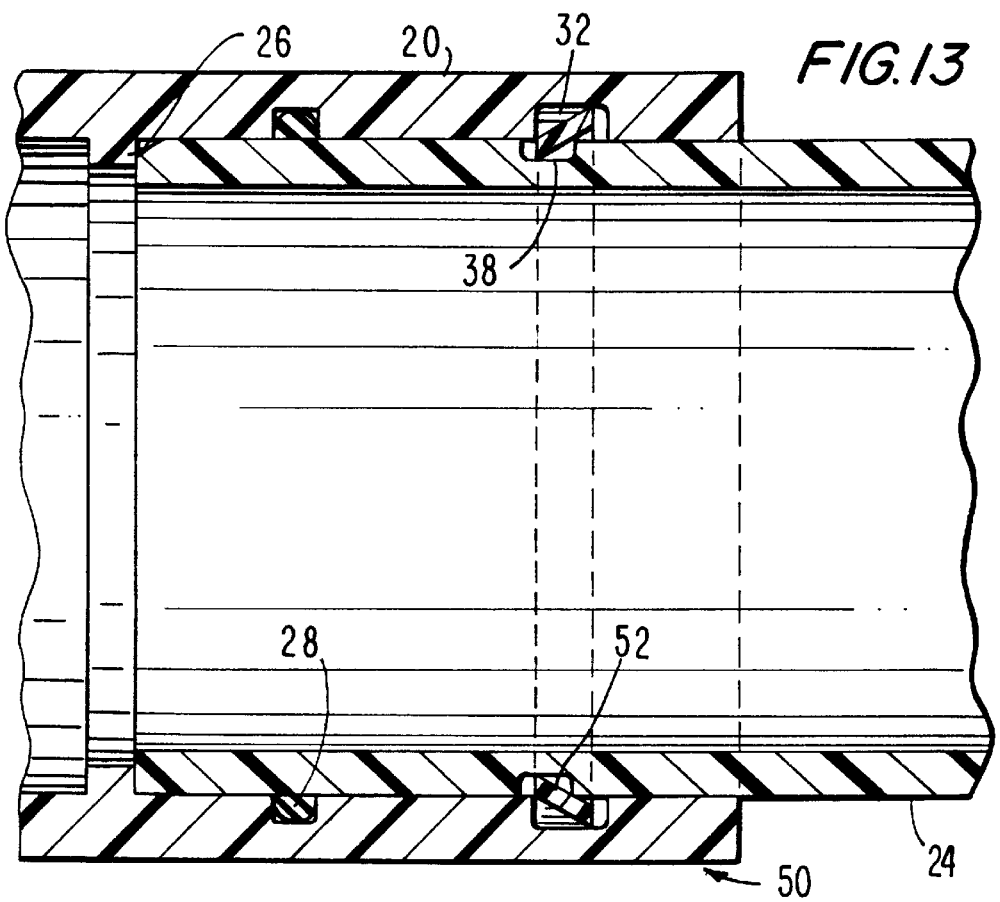

SNAP-ACTION PIPE COUPLING RETAINER WITH A RHOMBOIDAL CROSS-SECTION

CROSS-REFERENCE TO RELATED APPLICATIONS

This application is a continuation-in-part of application Ser. No. 08/665,477, filed Jun. 18, 1996, now U.S. Pat. No. 5,813,705.

BACKGROUND OF THE INVENTION

1. Field of the Invention

This invention relates to a coupling for joining together lengths of pipes, or, for attaching a fitting to a length of pipe, or, for joining fittings to each other.

2. Description of the Related Art

Couplings of this type are well-known in the art, a typical example being illustrated in Mahoney, U.S. Pat. No. 2,458,714 issued Jan. 11, 1949.

The coupling includes a tubular member which internally houses a sealing ring for cooperation with a pipe exterior, and a locking groove for the reception of a locking member, typically, a length of ductile wire or a coil spring which is inserted tangentially through an opening in the wall of the tubular member, and which extends between a groove formed in the tubular member and a juxtaposed groove formed in the outer periphery of the pipe. Thus the coupling includes the tubular member in combination with the locking member.

One disadvantage of such couplings is that the tubular member must first be assembled onto the pipe. The locking member must then be inserted tangentially through the aperture in the wall of the tubular member, and then pushed into encircling relation with the pipe periphery. The locking member is in this manner properly positioned within the internal groove in the tubular member and the external groove in the pipe periphery in bridging relationship therewith.

As will be readily apparent, the locking member can only be inserted tangentially into the tubular member at the time the groove in the interior of the tubular member and the exterior of the pipe periphery are in correct position of axial alignment. This, in turn, demands an extremely close tolerance in the positioning of the pipe and tubular member axially relative to each other for their respective grooves to be in axial alignment with each other. Commonly, a radial abutment is provided on the exterior of the pipe periphery, as taught by Mahoney in U.S. Pat. No. 2,458,714. More conveniently, the abutment can be provided internally of the tubular member as a shoulder that is engaged by the pipe end when the tubular member is correctly positioned over the pipe end.

It is known in the art to provide a locking member for such a coupling that can be withdrawn from the tubular member in the event that it is desired to disassemble the coupling from the pipe. This is done by pulling the locking member circumferentially out of the tubular member by grasping a free end of the locking member that extends out of the tangential opening in the tubular member. There still remains the problem that to secure the tubular member to the pipe, the member must be correctly assembled onto the end of the pipe, and then, and this possibly in a most inconvenient location, the retainer inserted into the tubular member and then forced circumferentially within the coupling into encircling relation with the pipe groove.

SUMMARY OF THE INVENTION

The present invention seeks to overcome this problem by providing a coupling that can be pre-loaded with a retainer prior to its positioning over the pipe end, the retainer being capable of radially outward movement against a resilient bias, and then being capable of snapping into the pipe groove under the resilient bias in order to produce a permanent interconnection between the coupling and the pipe.

According to the present invention, a coupling is provided which includes a retainer that is insertable into and removable from an interior groove in a tubular body through a tangentially extending aperture in the body communicating with the groove.

The retainer is formed from a spring material, such as spring steel or a relatively hard and resilient plastics material such as nylon, that can be provided with spring-like characteristics, the retainer being comprised of a continuous and flexible base band, which has formed along one of its longitudinal edges a plurality of spring fingers extending therefrom. Spring metal is also contemplated.

When inserted into the tubular body to form the coupling, the spring fingers extend radially inwards of the body and terminate on a diameter less than the internal diameter of the body, in this way to provide a multiplicity of spring fingers each extending radially inwards of the body. A portion of each spring finger has a generally cross-sectional configuration which is generally frusto-conical as will be seen in the description hereinbelow.

The spring fingers are configured as ramp cams, which upon insertion of a pipe into the coupling, are cammed in a radially outwards direction, thus permitting the entrance of the pipe into the coupling.

At the time the spring fingers become positioned in alignment with the groove in the pipe periphery, the spring fingers then snap radially inward into the pipe groove under their stored resilient bias, thus to provide a permanent interconnection between the coupling and the pipe.

The retainer can be withdrawn circumferentially from the tubular body by pulling the retainer out of the body in a tangential direction in order to disassemble the coupling.

As noted hereinabove, each spring finger is configured such that, when viewed in cross-section, at least a portion of the finger has a generally rhomboidal cross-sectional configuration. In particular the spring finger will appear to define a rhomboid.

In the latest embodiment, the pipe coupling incorporates an improved retainer member which is structured as a continuous strap-like retainer having a generally rhomboidal cross-sectional configuration at each cross-section, when positioned within the tubular body to form the coupling. Thus, in contrast to the previous embodiments disclosed, the continuous base band is eliminated and the angled spring fingers are replaced by a continuous strap-like member having a generally rhomboidal cross-sectional configuration similar to the cross-sectional configuration of the spring fingers of the previous embodiments.

The latest embodiment of the pipe coupling comprises a tubular body having an inner opening and a transverse peripheral inner groove extending generally radially outwardly of the inner opening, the tubular body further having an aperture which is generally tangential to the inner groove, the aperture further being generally transverse to the central axis of the tubular body and communicating with the inner groove. A retainer member is positionable within the inner groove through the generally tangential opening and removable therefrom, the retainer member being formed of a band of resilient material. As in the previous embodiments, at least a portion of the retainer member has a generally rhomboidal cross-sectional configuration; however in the present and preferred embodiment, the retainer member has a frusto-conical cross-sectional configuration at substantially all cross-sections.

Preferably, the coupling will be used with pipes which incorporate a tapered groove which corresponds to the rhomboidal shaped retainer member to receive the retainer member in nestled relation. However, pipes incorporating a generally rectangular groove as in the previous embodiments may also be used with this coupling.

More particularly, the pipe coupling comprises a generally tubular body defining a generally central axis and having an inner opening and a generally transverse peripheral inner groove extending generally radially outwardly of the inner opening. The generally tubular body has an aperture which is generally tangential to the inner groove and generally transverse to the generally central axis. The generally transverse aperture communicates with the inner groove. A flexible, resilient retainer member has at least two ends, and is positionable within the inner groove by insertion of at least one of the ends into the generally tangential aperture and removable from the inner groove by withdrawal thereof through the generally tangential aperture. At least a portion of the retainer member has a generally rhomboidal cross-sectional configuration such that one arcuate portion is on a first diameter less than an internal diameter of the tubular body, and being deflectable radially outwardly to a second diameter greater than the first diameter.

In one preferred embodiment, the retainer member is comprised of a resilient plastics material, preferably nylon. In another embodiment, the retainer member is comprised of a spring steel material.

It has been found that the improved retainer member can be handled with relative ease, particularly while being inserted or removed from the tangential aperture in the tubular body. Further, the force required to cause the retainer member to permit insertion of a pipe into the coupling is less than the force required in the previously described embodiments, due in part to the elimination of the continuous and flexible base band, thus eliminating the need to actually compress the rhomboidal shaped finger portions toward and away from the base band.

DESCRIPTION OF THE DRAWINGS

Preferred embodiments of the invention will be described hereinbelow with reference to the drawings, wherein:

FIG 4 is a perspective view of one preferred form of retainer according to the present invention, and as is employed in the embodiment of FIG. 3;

FIGS. 5–7 illustrate in cross-section, alternative configurations of the retainer constructed according to the present invention;

FIG. 10 is a cross-sectional view taken along lines 10—10 of FIG. 9, illustrating the assembled coupling and retained pipe in cross-section;

FIG. 11 is a cross-sectional view taken along lines 11—11 of FIG. 10, illustrating the assembled coupling and pipe secured together by the strap-like retainer shown in FIG. 8;

FIG. 12 is a cross-sectional view of the pipe coupling of FIG. 11 with the pipe separated therefrom, and illustrating in cross-section, the rhomboidal shaped retainer positioned within the peripheral inner groove of the coupling; and FIG. 13 is a cross-sectional view of a pipe coupling, illustrating an alternative pipe groove construction.

DESCRIPTION OF THE PRIOR ART

Figure 1:
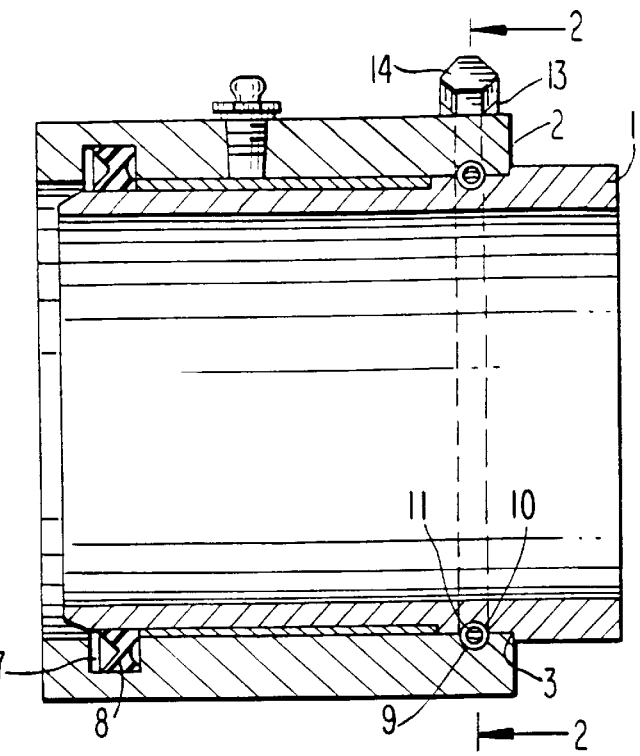
FIG. 1 illustrates the prior art coupling disclosed by Mahoney in U.S. Pat. No. 2,458,714.
Figure 2:
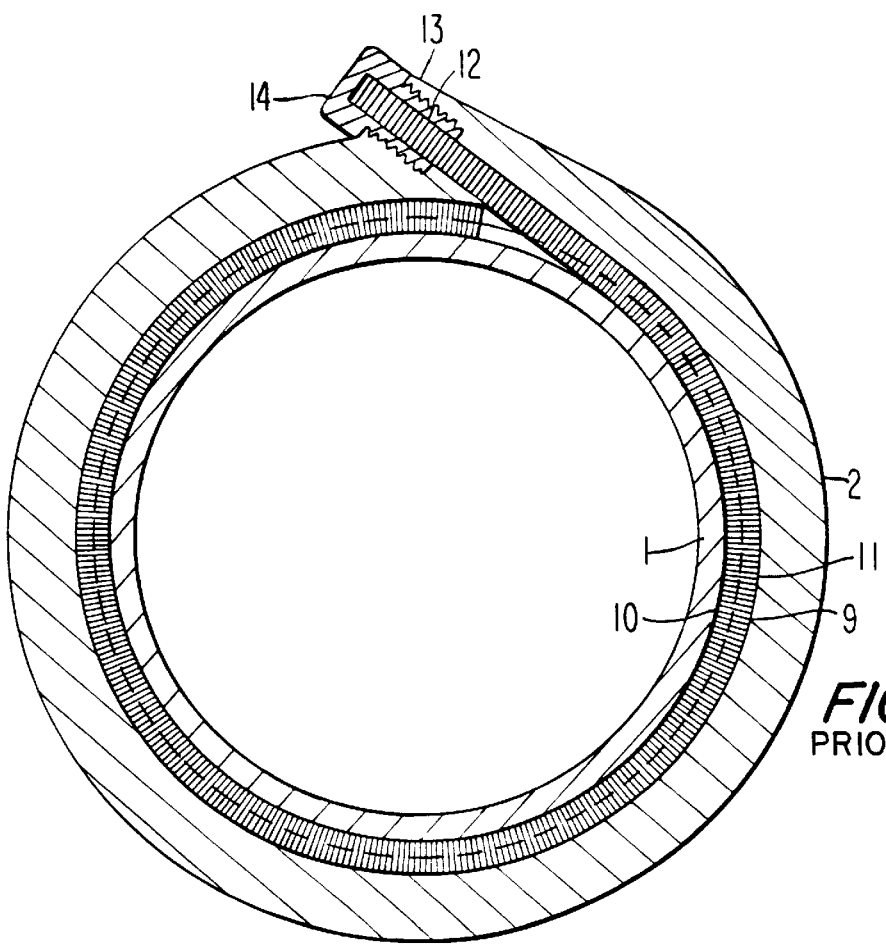
FIG. 2 is a cross-section taken along lines 2—2 of FIG. 1.

Referring initially to FIGS. 1 and 2, the prior art coupling includes a tubular conduit 2 that is sized internally for it to be received over the outer periphery of an inner conduit 1.

A circumferential groove 9 is provided in the interior of the coupling, and, a corresponding groove 10 is provided in the outer periphery of the inner conduit 1, in order to permit the insertion of a flexible shaft or cable 11 circumferentially into the coupling when the grooves 9 and 10 are in proper axial alignment.

One end 12 of the cable 11 extends tangentially of outer conduit 2, in order to permit the insertion of the cable circumferentially into the coupling, or its withdrawal thereof circumferentially of the coupling in the event that it is desired to disassemble the coupling from the pipe.

A further internal groove 7 is provided within the coupling and houses a sealing ring 8. The cable is secured within the coupling by a cap screw 14 threadedly received within a boss 13 of the coupling.

In order to assemble the coupling of the prior art, the appropriately configured conduit 1 must be inserted into the conduit 2 prior to insertion of the cable 11, insertion of the cable 11 demanding manual dexterity, which may be required in a location that is highly inconvenient to a workman.

DESCRIPTION OF THE PREFERRED EMBODIMENTS

Figure 3:
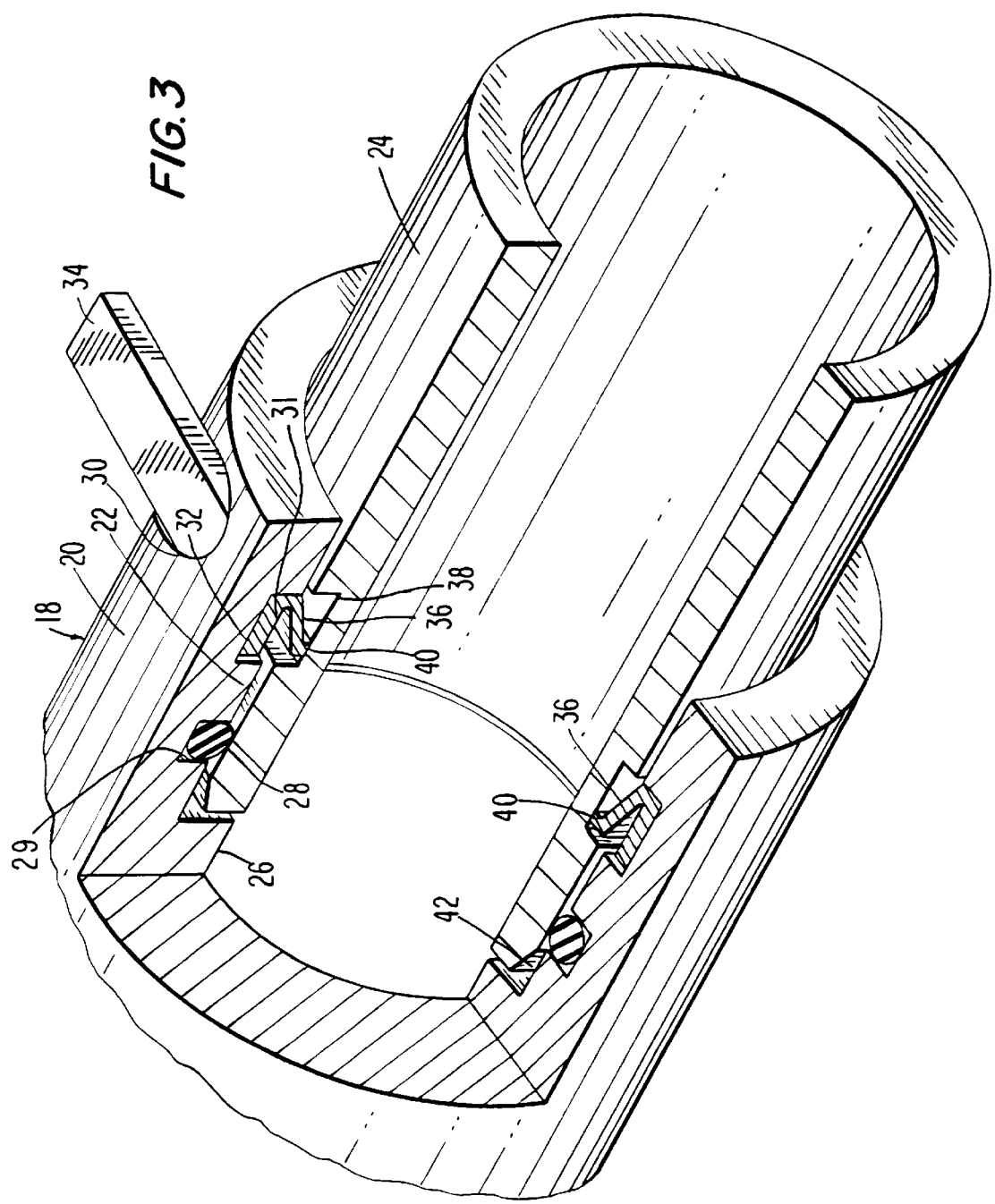
FIG. 3 is a fragmentary perspective view, partially cut away, of a pipe coupling according to the present invention showing a pipe retained in position by the coupling.

Referring now to FIG. 3, a coupling 18 according to the present invention is illustrated, that coupling including tubular body 20 having an internal bore 22 configured to accept a pipe 24, the coupling having an internal abutment 26, and also including an O-ring seal 28 located within an internal groove 29 in the body 20.

The body 20 has a tangential inlet 30 which communicates with groove 32 in the interior of the body 20. A retainer 34, is inserted through the tangential opening 30, and is then fed circumferentially within the internal groove 32 in the coupling, the retainer 34 being formed of a spring-like material that normally extends radially outwards and expands into seated relation with the axially extending wall of the groove 32 in the body 20.

Assembly of the retainer 34 into the body 20 is effected prior to the insertion of the pipe 24 into the assembled coupling 18. In particular, the retainer 34 can be preassembled into the body 20 at a position entirely remote from the pipe 24, optionally at the point of manufacture of the body 20.

At the point of assembly of the coupling 18 onto the pipe 24, the coupling 18 can then be slid axially of the pipe 24 to provide the required interconnection of the coupling 18 with the pipe 24.

In order to permit insertion of the end of the pipe 24 into the assembled coupling 18 formed of body 20 and retainer 34, in one preferred embodiment the retainer 34 is formed, as illustrated in FIG. 4, of a continuous strap-like base band 31, with serially arranged spring fingers 36, that are cammed radially outwardly within the body 20 by the pipe to permit the axial insertion of the pipe 24 into the assembled coupling 18. In particular, fingers 36 are cammed radially outwardly toward base band 31, thus overcoming the inherent resistance of the unitary spring-like structure.

Upon the end of the pipe reaching the end stop 26, the respective spring fingers 36 will have become positioned in radial alignment with a groove 38 formed in the external periphery of the pipe, at which time, the spring fingers 36 are free to return their original position under the spring force stored within the fingers 36, for the free ends of the spring fingers 36 to extend on a diameter less than the external diameter of the pipe 24. At that time, the spring fingers 36 extend into the groove 38, and are operative to prohibit axial removal of the pipe from the coupling, the spring fingers 36 then being located behind the radial side wall of the groove 38. The groove 38 shown is generally rectangular. However, alternatively shaped grooves may be utilized. Preferably the fingers 36 are dimensioned to engage the bottom wall of the groove 38 with a predetermined inward radial force. However, alternatively, direct contact therebetween is not necessary to the practice of the invention and a slight radial space may be provided.

Preferably, the spring fingers 36 terminate at their free ends in stop members 40 that extend radially of the pipe axis, and which thus provide a positive end stop inhibiting axial movement of the coupling and pipe relative to each other.

In the event that an attempt is made to move the coupling 18 and pipe 24 relative to each other, movement in one direction is prevented by the end stop 26. Extremely limited relative movement between the coupling 18 and pipe 24 in the opposite direction possibly can occur depending on the closeness of the stop member 40 to the juxtaposed side wall of the groove 38. Such movement will, however, be of an extremely limited extent.

When the side wall of the groove 38 has contacted the stop members 40 of the spring fingers 36, further axial movement in that direction is inhibited. Any further attempt to move the coupling 18 and pipe 24 relative to each other in that direction will result in a compressive force being exerted on the spring fingers 36 which is translated to the base band 31, and in turn, translated into reaction forces on the upper and side walls of the groove 32 in the body 20.

The retainer 34 thus acts with a snap-action permitting ready entry of the pipe 24 into the body 20, and, once the pipe has reached the end stop 26, then inhibits removal of the pipe 24 from the interior of the coupling 18.

This snap-action of the retainer 34 permits the coupling 18 and pipe to be assembled to each other in any location that will permit the required axial movement of the coupling 18 and pipe 24 relative to each other. The assembly then becomes a permanent coupling 18 until such time as the retainer 34 is withdrawn circumferentially through tangential inlet 30 and out of the body 20. This can readily be accomplished, when intended, by grasping the free end of the retainer 34 with a pair of pliers, or by hand, and by then pulling the retainer 34 tangentially out of the body 20.

In order to provide the required camming action on the stop members 40 of the spring fingers 36, the pipe is formed with a bevel 42 at its free end. This requirement for bevelling of the free end of the pipe 24 can be eliminated by minor modification of the spring fingers 36, as now described with reference to FIGS. 5–7.

As illustrated in FIG. 5, the spring fingers 36 are devoid of stop members 40. Thus, the requirement for a bevel 42 on the pipe 24 is eliminated, and the spring fingers 36 may be forced radially upwards by the un-bevelled end of the pipe 24 as it enters the coupling 18, and then springing back into engagement with the bottom wall of the groove 38. The fingers 36 are thus placed under compressive loading if any attempt is made to withdraw the pipe 24 axially from the coupling 18.

An alternative to the construction of FIG. 5 is shown in FIG. 6, in which end stops 40a are provided on the spring fingers 36 having stop members 40a that extend away from body 20.

Another alternative construction of retainer 34 is shown in FIG. 7 wherein the spring fingers 36a are formed as curvilinear members that will provide the required outward camming action of the spring fingers upon insertion of the pipe 24 into coupling 18.

Preferably the retainer 34 and spring fingers 36 may be formed from a spring metal, such as spring steel. Optionally, and for light load applications, the retainer 34 can be formed of a suitable relatively hard, but resilient plastics material, such as nylon or the like.

The body 20 and the pipe 24 similarly can be manufactured from a metal, such as ductile iron or stainless steel, or equally well can be comprised of a suitable plastics material, such as polyvinyl chloride (PVC), high density polyethylene (HDPE), or the like.

Further modifications of the embodiments thus far disclosed that incorporate the basic features of the present invention will suggest themselves to persons skilled in the art. Those features relate to the provision of a pipe coupling formed of a tubular body and a retainer, the retainer having spring fingers, at least a portion of which have a generally rhomboidal cross-sectional configuration. The fingers extend radially inward of the tubular body and are deflected in a radially outward direction by insertion of a pipe into the coupling. The spring fingers are then restored toward their original positions by the stored spring force and, preferably engage the bottom wall of pipe groove 38 with a predetermined force, and extend on a diameter less than the external diameter of the pipe. Alternatively, fingers 36 need not engage the bottom wall of the groove 38, but may be dimensioned to provide a slight radial space therebetween.

Referring now to FIGS. 8–11 an improved coupling 50 is shown which includes tubular body 20 having an improved retainer 52, shown separated therefrom for illustration purposes. A pipe 24 intended for assembly with the assembled coupling 50 is also shown. In the coupling 50 shown in FIG. 8, body 20 has an internal bore 22 configured to accept the pipe 24. The body 20 has an internal end stop 26, and also includes an O-ring 28 which is located within an internal groove 29 in the body 20. The body 20 has a tangential inlet 30 which communicates with generally circular groove 32 in the interior of the body 20. The description thus far of the coupling 50 shown in FIGS. 8–11 is similar in some respects to the coupling described in the previous embodiments.

In contrast thereto, in the embodiment illustrated in FIGS. 8–11, a retainer member 52 is incorporated which is similar in some respects to retainer 34 described in connection with the previous embodiments, except that the individual spring fingers 36 of the previous embodiments have been eliminated and replaced essentially by a continuous member formed as if spring fingers 36 were hypothetically connected to form a continuous strap-like member. In addition, in the embodiment of the retainer 52 shown in FIGS. 8–11 the base band 31 has been eliminated and the stop members 40 have been eliminated, thus leaving a continuous strap-like retainer 52 having two ends and a generally rhomboidal configuration at substantially all cross-sections when positioned within generally circular groove 32. As in the previous embodiments, the body 20 and pipe 24 can be manufactured from a metal, such as ductile iron or stainless steel, or equally well can be comprised of a suitable plastics material, such as polyvinyl chloride (PVC), high density polyethylene (HDPE), or the like. Likewise, the retainer 52 can be made of a resilient plastics material such as nylon or the like, or a spring metal such as spring steel. Other materials bearing the requisite characteristics are contemplated.

Referring again to the Figs., assembly of the retainer 52 with the body 20 to form the coupling 50 is effected in an identical fashion to the assembly procedure described in connection with the previous embodiments. In particular, the retainer 52 is inserted into the tangential inlet 30 of body 20 prior to insertion of the pipe 24 into body 20. Due to the continuous structure of the retainer 52, insertion and removal from body 20 is accomplished with ease by sliding movements. The retainer 52 can be preassembled into the body 20 to form coupling 50 at a location entirely remote from the pipe 24, or optionally at the point of manufacture of the body 20.

At the point of assembly of the coupling 50 onto the pipe 24, the coupling 50 can then be slid axially of the pipe 24 to provide the required interconnection of the coupling 50 with the pipe 24.

In order to permit insertion of the end of the pipe 24 into the assembled tubular body 20 and retainer 52, in the present embodiment the retainer 52 is formed as described, i.e., without the serially arranged spring fingers 36 shown in the previous embodiments. Moreover, the stop members 40 have been eliminated. Thus, the retainer 52 can be slid more easily into the tangential inlet 30 to be positioned circumferentially within grove 32 for reception of pipe 24 into coupling 52. Removal of retainer 52 from inlet 30 is also simplified, and sliding the retainer outwardly of inlet 30 is also accomplished smoothly with relative ease.

Figure 8:
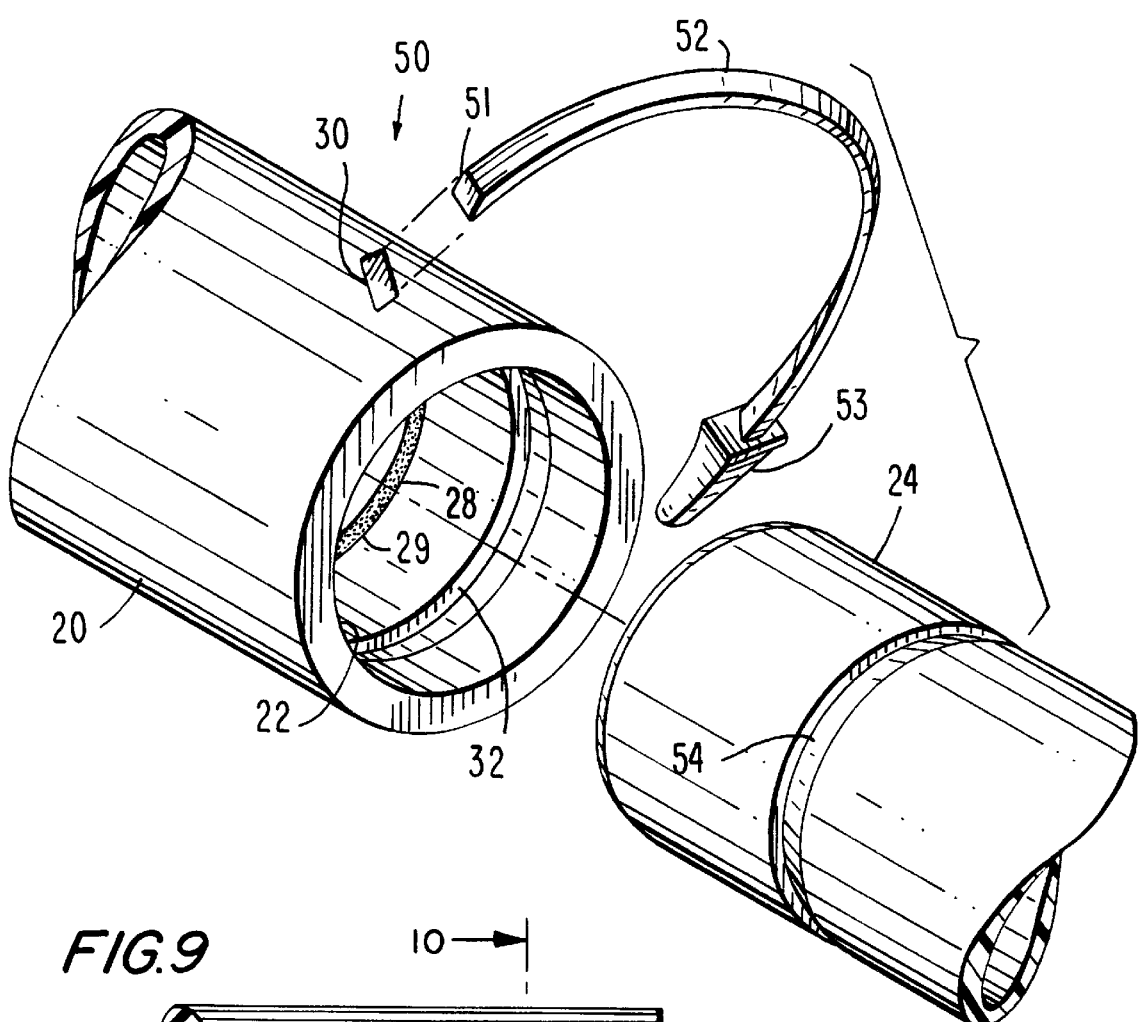
FIG. 8 is a perspective view, with parts separated for illustrative purposes, of an alternative embodiment of a pipe coupling incorporating the latest preferred retainer constructed according to the invention, such retainer having a generally rhomboidal configuration at substantially all cross-sections when positioned within the generally circular inner groove of the tubular body.
Figure 9:
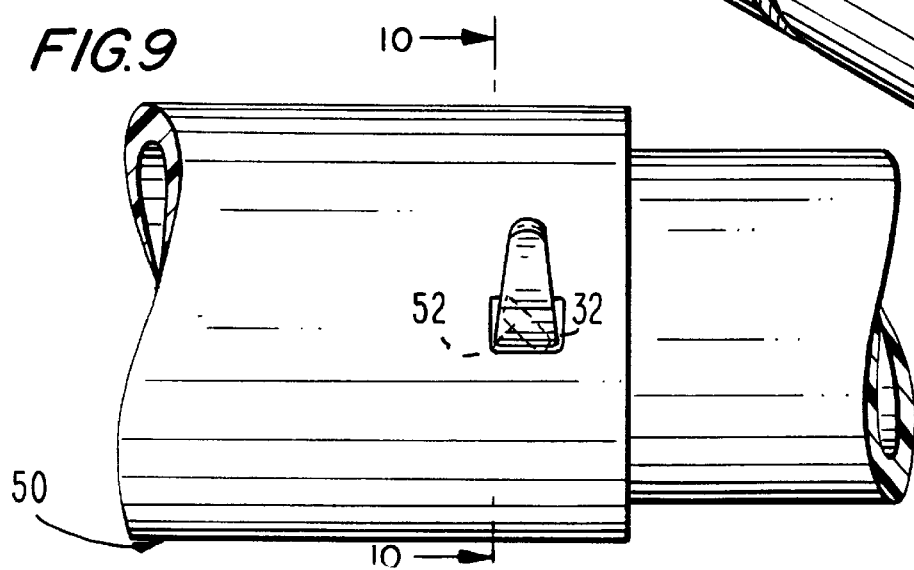
FIG. 9 is a side elevational view of the tubular body and retainer of FIG. 8, assembled to form a coupling, with a pipe retained in position within the coupling.

Referring now to FIG. 9 there is shown a side elevational view of the assembled components of coupling 50 of FIG. 8, with the body 20 and retainer 52 assembled to form the coupling 50, and the pipe 24 fully retained within the coupling 50.

Referring now to FIGS. 10–11, there is illustrated a cross-sectional view of the assembled coupling 50 and pipe 24 of FIG. 9 with the retainer 52 nestled in position within groove 32 to retain the coupling and the pipe 24 in assembled relation. The retainer 52 is shown in dotted lines and is positioned partially within the groove 32 in the body 20 and partially within the outer groove of pipe 24.

In FIG. 11 there is illustrated a cross-sectional view taken along lines 11—11 of FIG. 10, illustrating the position of retainer 52 partially within inner groove 32 of body 20, and nestled within outer circumferential groove 54 of pipe 24. End stop 26 and O-ring 28 are also shown in cross-section. As can be seen in FIG. 11 the retainer 52 assumes a frusto-conical shape when viewed in cross-section as positioned within groove 32 of body 20 and outer circumferential groove 54 of pipe 24. However, it is particularly noted, that the application shown in FIGS. 8–11 includes a pipe 24 which has a preferred tapered groove 54 configured to match the shape of the rhomboidal shaped retainer 52 such that the retainer becomes nestled within the outer groove 33 as shown. As in the previous embodiments, separation of the coupling 50 and pipe 24 is inhibited by engagement of the retainer 52 with the side wall 35 of groove 32 due to their interfering relation. Similarly relative movement of pipe 24 toward coupling 50 is in turn restrained by engagement of the end 23 of pipe 24 with end stop 26 formed internally of the coupling.

Referring now to FIG. 12 in conjunction with FIG. 8, the assembly procedure of coupling 50 with pipe 24 is illustrated. Retainer 52 has two ends, a first free end 51 which is tapered for ease of insertion into tangential aperture 30, and to complement the matching surface of the retainer when looped upon itself as shown in FIG. 10. A second end of retainer 52 includes a gripping member 53 also shown in FIGS. 8 and 10. When the first free end 51 of the retainer 52 is inserted tangentially into opening 30 of body 20 and made to be positioned circumferentially within groove 32 of body 20 to form coupling 50, the retainer assumes a generally circular shape and also assumes the frusto-conical shape shown in the cross-sectional view of FIGS. 11 and 12. At a later time the assembly procedure of pipe 24 with coupling 50 may be carried out as illustrated in FIG. 12 whereby the pipe 24 is inserted into the open end of coupling 50 until the free end 23 of pipe 24 abuts end stop 26. At this point the internal diameter of retainer 52 has been somewhat expanded by engagement with the outer surface of pipe 24 until the tapered groove 54 in pipe 24 becomes aligned with retainer 52. Due to the resilience of the retainer 52, the retainer snaps into position into groove 54 in pipe 24 such that the retainer becomes nestled within the tapered groove 54 as shown, thereby preventing separation of the members as described in connection with the previous embodiments. Thus, any forces applied to pipe 24 to withdraw it from coupling 50 will be resisted by the engagement of retainer 52 with the wall 33 of groove 32 as described in connection with FIG. 11. Similarly any forces which tend to move pipe 24 further into coupling 50 will be resisted by the engagement of the end 23 of pipe 24 with end stop 26.

Referring now to FIG. 13 there is illustrated an alternative use of the present coupling 50 with a pipe 24 which is provided with a rectangular shaped groove 38 configured for alternatively shaped retainers, particularly retainers of the type described in the previous embodiments. In particular, the groove 32 in body 20 and the groove 38 in pipe 24 are as described in connection with the previous embodiments shown in FIGS. 3–7. It can be seen that the retainer 52 of the present embodiment will readily cooperate with the alternatively shaped grooves intended for other retainers and may be positioned in working relation with the body 20 and pipe 24 as shown in FIG. 13. The retainer 32 shown in FIG. 13 prevents separation of pipe 24 and coupling 50 in the manner described in connection with the previous embodiments.

Further modifications of the embodiments described in connection with FIGS. 8–13 that incorporate the basic features of those embodiments will suggest themselves to persons skilled in the art. In particular, those features relate to the provision of a pipe coupling having a tubular body and a retainer, wherein the retainer is positionable within a generally circular shaped inner groove of the body through a tangential opening and removable therefrom, the retainer being formed of a band of resilient material, at least a portion of which has a generally rhomboidal cross-sectional configuration, preferably at substantially all cross-sections therearound, when positioned within the circular inner groove.

What is claimed is:

1. A pipe coupling, which comprises:
   a) a tubular body having an inner opening for receipt of a grooved end of a pipe to which the pipe coupling is to be attached, the tubular body further having an inner diameter and circumference, a central axis extending longitudinally through the tubular body and coaxially with the inner opening, a transverse peripheral inner groove, having a depth, extending radially circumferentially outwardly of the inner opening, and an aperture which is tangential to the inner groove, the aperture further being transverse to the central axis of the tubular body and in communication with the inner groove; and
   b) a retainer member positionable within the inner groove through the tangential opening and slidably removable therefrom, the retainer member being formed of a continuous band of resilient material, having first and second opposite ends and a length at least as long as the inner circumference of the tubular body, the retainer member assuming a frusto-conical overall configuration when positioned within the inner groove, with a cross section of the retainer member having a rhomboidal shape at each cross-section along the length of the retainer member, the retainer member having a thickness greater than the depth of the inner groove in the tubular body,
   such that when a pipe having an outer groove extending circumferentially about an outer surface of the pipe towards an end thereof is inserted into the tubular body of the pipe coupling, and the inner groove in the tubular body and the outer groove on the outer surface of the pipe are in alignment, the retainer member engages with and extends at least partially into the outer groove of the pipe to thereby releasably couple the pipe to the pipe coupling.

2. The pipe coupling according to claim 1, wherein the resilient material is a plastic.

3. The pipe coupling according to claim 2, wherein the plastic is nylon.

4. The pipe coupling, according to claim 1, wherein the retainer member is made of a spring metal.

5. The pipe coupling according to claim 1, wherein the tubular body is made of a material selected from the group consisting of ductile iron, stainless steel, polyvinyl chloride (PVC) and high density polyethylene (HDPE).

6. A pipe coupling, which comprises:
   a) a tubular body having a longitudinal central axis, an inner opening coaxial with the central axis, for receipt of a grooved end of a pipe to which the pipe coupling is to be attached, and a transverse peripheral inner groove extending radially outwardly of the inner opening, the tubular body further having an aperture which is tangential to the inner groove, the aperture further being transverse to the central axis of the tubular body and communicating with the inner groove; and
   b) a flexible, continuous resilient retainer member having first and second opposite ends and a length, the retainer member being positionable in the peripheral inner groove by insertion of one end of the retainer member into the tangential aperture, the retainer member assuming a frusto-conical overall configuration when positioned in the inner groove, with a cross section of the retainer member having a rhomboidal shape at each cross-section along its length, whereby a first arcuate portion of the frusto-conically configured retainer member has a diameter less than a diameter of a second arcuate portion of the frusto-conically configured retainer member and less than an internal diameter of the tubular body, the first arcuate portion being deflectable radially outwardly to a second diameter greater than the first diameter, when a pipe having an outer groove extending circumferentially about an outer surface of the pipe towards an end thereof is inserted into the tubular body of the pipe coupling, and the inner groove in the tubular body and the outer groove on the outer surface of the pipe are in alignment, the retainer member engages with and extends at least partially into the outer groove of the pipe to thereby releasably couple the pipe to the pipe coupling.

7. The pipe coupling according to claim 6, wherein the retainer member is made of a resilient plastic material.

8. The pipe coupling according to claim 7, wherein the resilient plastic material is nylon.

9. The pipe coupling according to claim 6, wherein the retainer member is made of a spring metal.

10. The pipe coupling according to claim 6, wherein the tubular body is made of a material selected from the group consisting of ductile iron, stainless steel, polyvinyl chloride (PVC) and high density polyethylene (HDPE).

11. A pipe coupling, which comprises:
    a) a tubular body having a longitudinal central axis, an inner opening, coaxial with the central axis, for receipt of a grooved end of a pipe to which the pipe coupling is to be attached, and a transverse peripheral inner groove extending radially outwardly of the inner opening, the tubular body further having an aperture which is tangential to the inner groove and transverse to the central axis, the transverse aperture communicating with the inner groove; and
    b) a flexible, continuous resilient retainer member having first and second opposite ends and a length, the retainer member being positioned within the inner groove by insertion of at least one of the ends into the tangential aperture and being removable from the inner groove by withdrawal of the retainer member through the tangential aperture, the retainer member assuming a frusto-conical overall configuration when positioned in the inner groove, with a cross section of the retainer member having a rhomboidal shape at each cross-section along its length, such that one arcuate portion of the frusto-conically configured retainer member has a first diameter less than an internal diameter of the tubular body, and is deflectable radially outwardly to a second diameter greater than the first diameter, when a pipe having an outer groove extending circumferentially about an outer surface of the pipe towards an end thereof is inserted into the tubular body of the pipe coupling, and the inner groove in the tubular body and the outer groove on the outer surface of the pipe are in alignment, the retainer member engages with and extends at least partially into the outer groove of the pipe to thereby releasably couple the pipe to the pipe coupling.

12. The pipe coupling according to claim 11, wherein the retainer member is made of a resilient plastic material.

13. The pipe coupling according to claim 12, wherein the resilient plastic material is nylon.

14. The pipe coupling according to claim 11, wherein the retainer member is made of a spring metal.

15. The pipe coupling according to claim 11, wherein the tubular body is made of a material selected from the group consisting of ductile iron, stainless steel, polyvinyl chloride (PVC) and high density polyethylene (HDPE).

16. A pipe coupling, which comprises:
   a) a tubular body having a central axis, an inner longitudinal opening, and a transverse peripheral inner groove extending radially outwardly of the inner opening, the tubular body further having an aperture which is tangential to the inner groove, the aperture further being transverse to the central axis of the tubular body and communicating with the inner groove; and
   b) a flexible, continuous resilient retainer member made of a relatively hard, resilient plastic material, the retainer member having first and second opposite ends and a length, the first end being tapered for insertion into the tangential aperture, and the second end having means attached thereto for gripping the retainer member, the retainer member being positionable within the inner groove by insertion of at least one end thereof into the tangential aperture such that the retainer member assumes a circular shape corresponding to the shape of the inner groove, the retainer member having a rhomboidal cross-sectional configuration at all cross-sections along the length of the retainer, when positioned in the groove, at least one arcuate edge thereof being on a first diameter less than an internal diameter of the tubular body, and being resiliently deflectable radially outwardly to a second diameter greater than the first diameter, when a pipe having an outer groove extending circumferentially about an outer surface of the pipe towards an end thereof is inserted into the tubular body of the pipe coupling, and the inner groove in the tubular body and the outer groove on the outer surface of the pipe are in alignment, the retainer member engages with and extends at least partially into the outer groove of the pipe to thereby releasably couple the pipe to the pipe coupling.

17. The pipe coupling according to claim 11, wherein the retainer member has a first end portion tapered for ease of insertion into the tangential aperture, and a second end portion has a gripping member for gripping the retainer for insertion into and removal from the tangential aperture.

18. A method of forming a pipe coupling, comprising:
   a) providing a tubular body defining a central axis and having an inner opening, and a transverse peripheral inner groove extending radially outwardly of the inner opening, the tubular body having an aperture which is tangential to the inner groove, the aperture further being transverse to the central axis of the tubular body, and communicating with the inner groove;
   b) providing a flexible, resilient retainer member having a length and two ends, at least a portion of the retainer member having a rhomboidal cross-sectional configuration when arranged to assume a circular configuration; and
   c) inserting one of the ends of the retainer member into the tangential aperture so as to position the retainer member within the inner groove whereby the retainer member has a rhomboidal cross-sectional configuration when arranged to assume a circular configuration within the inner groove, such that at least one arcuate free edge is on a first diameter less than an internal diameter of the tubular body, and is deflectable radially outwardly to a second diameter greater than the first diameter.

19. The method according to claim 18, wherein the flexible resilient retainer member is made of a resilient plastic material.

20. The method according to claim 19, wherein the resilient plastic material is nylon.

21. The method according to claim 18, wherein the retainer member is made of a spring metal.

22. The pipe coupling according to claim 1, wherein the retainer member is pre-positioned within the inner groove of the tubular body by slidably inserting the retainer member into the aperture in the tubular body prior to insertion of a pipe to which the pipe coupling is to be attached.

23. The pipe coupling according to claim 4, wherein the spring metal is steel.

24. The pipe coupling according to claim 1, wherein the inner opening of the tubular body has an end stop therein to limit the distance that a pipe is insertable into the pipe coupling.

25. The pipe coupling according to claim 1, wherein one end of the retainer member is tapered for ease of insertion into the tangential aperture, and the opposite end of the retainer member has a gripping member for gripping the retainer member for insertion into and removal from the tangential aperture.

26. The pipe coupling according to claim 1, which further includes an O-ring positioned in an internal groove in the tubular body in order to make the pipe coupling liquid-tight.

27. The pipe coupling according to claim 6, wherein the retainer member is pre-positioned within the inner groove of the tubular body by slidably inserting the retainer member into the aperture in the tubular body prior to insertion of a pipe to which the pipe coupling is to be attached.

28. The pipe coupling according to claim 9, wherein the spring metal is steel.

29. The pipe coupling according to claim 6, wherein the inner opening of the tubular body has an end stop therein to limit the distance that a pipe is insertable into the pipe coupling.

30. The pipe coupling according to claim 6, wherein one end of the retainer member is tapered for ease of insertion into the tangential aperture, and the opposite end of the retainer member has a gripping member for gripping the retainer member for insertion into and removal from the tangential aperture.

31. The pipe coupling according to claim 6, which further includes an O-ring positioned in an internal groove in the tubular body in order to make the pipe coupling liquid-tight.

32. The pipe coupling according to claim 11, wherein the retainer member is pre-positioned within the inner groove of the tubular body by slidably inserting the retainer member into the aperture in the tubular body prior to insertion of a pipe to which the pipe coupling is to be attached.

33. The pipe coupling according to claim 14, wherein the spring metal is steel.

34. The pipe coupling according to claim 11, wherein the inner opening of the tubular body has an end stop therein to limit the distance that a pipe is insertable into the pipe coupling.

35. The pipe coupling according to claim 11, which further includes an O-ring positioned in an internal groove in the tubular body in order to make the pipe coupling liquid-tight.

36. The pipe coupling according to claim 16, wherein the retainer member is pre-positioned within the inner groove of the tubular body by slidably inserting the retainer member into the aperture in the tubular body prior to insertion of a pipe to which the pipe coupling is to be attached.

37. The pipe coupling according to claim 16, wherein the resilient material is a plastic.

38. The pipe coupling according to claim 37, wherein the plastic is nylon.

39. The pipe coupling, according to claim 16, wherein the retainer member is made of a spring metal.

40. The pipe coupling according to claim 39, wherein the spring metal is steel.

41. The pipe coupling according to claim 16, wherein the tubular body is made of a material selected from the group consisting of ductile iron, stainless steel, polyvinyl chloride (PVC) and high density polyethylene (HDPE).

42. The pipe coupling according to claim 16, wherein the inner opening of the tubular body has an end stop therein to limit the distance that a pipe is insertable into the pipe coupling.

43. The method according to claim 21, wherein the spring metal is steel.

44. The method according to claim 18, wherein the tubular body is made of a material selected from the group consisting of ductile iron, stainless steel, polyvinyl chloride (PVC) and high density polyethylene (HDPE).

45. The method according to claim 18, wherein the retainer member is pre-positioned within the inner groove of the tubular body by slidably inserting the retainer member into the aperture in the tubular body prior to insertion of a pipe to which the pipe coupling is to be attached.

46. The method according to claim 18, wherein the inner opening of the tubular body has an end stop therein to limit the distance that a pipe is insertable into the pipe coupling.

47. The method according to claim 18, wherein one end of the retainer member is tapered for ease of insertion into the tangential aperture, and the opposite end of the retainer member has a gripping member for gripping the retainer member for insertion into and removal from the tangential aperture.

48. The method according to claim 18, which further includes providing an O-ring positioned in an internal groove in the tubular body in order to make the pipe coupling liquid-tight.

49. A method of joining a pipe coupling to a pipe, comprising:
   a) providing a pipe coupling having:
      i) a tubular body having a central longitudinal axis, an inner opening, and a transverse peripheral inner groove extending radially outwardly of the inner opening, the tubular body further having an aperture which is tangential to the inner groove, the aperture further being transverse to the central axis of the tubular body, and communicating with the inner groove; and
      ii) a flexible, resilient retainer member having a length and two ends, at least a portion of the retainer member having a rhomboidal cross-sectional configuration when arranged to assume a circular configuration;
   b) inserting one of the ends of the retainer member into the tangential aperture so as to position the retainer member within the inner groove whereby the retainer member has a frusto-conical, rhomboidal cross-sectional configuration when arranged to assume a circular configuration within the inner groove, such that at least one arcuate free edge is on a first diameter less than an internal diameter of the tubular body, and is deflectable radially outwardly to a second diameter greater than the first diameter; and
   c) inserting an end of a length of pipe having an outer groove extending circumferentially about an outer surface of the pipe towards an end thereof is inserted into the tubular body of the pipe coupling, and the inner groove in the tubular body and the outer groove on the outer surface of the pipe are in alignment, the retainer member engages with and extends at least partially into the outer groove of the pipe to thereby releasably couple the pipe to the pipe coupling.

50. A method for performing one of the operations selected from the group consisting of joining two pipes, attaching a fitting to a pipe, and joining two fittings together, the method comprising:
   a) providing a pipe coupling according to claim 43; and
   b) performing one of the operations selected from the group consisting of:
      i) attaching a pipe at each end of the pipe coupling;
      ii) attaching a pipe at one end of the pipe coupling and a fitting at the opposite end of the pipe coupling; and
      iii) attaching a fitting at each end of the pipe coupling.

51. A method for performing one of the operations selected from the group consisting of joining two pipes, attaching a fitting to a pipe, and joining two fittings together, the method comprising:
   a) providing a pipe coupling according to claim 43; and
   b) performing one of the operations selected from the group consisting of:
      i) attaching a pipe at each end of the pipe coupling;
      ii) attaching a pipe at one end of the pipe coupling and a fitting at the opposite end of the pipe coupling; and
      iii) attaching a fitting at each end of the pipe coupling.

52. A method for performing one of the operations selected from the group consisting of joining two pipes, attaching a fitting to a pipe, and joining two fittings together, the method comprising:
   a) providing a pipe coupling according to claim 45; and
   b) performing one of the operations selected from the group consisting of:
      i) attaching a pipe at each end of the pipe coupling;
      ii) attaching a pipe at one end of the pipe coupling and a fitting at the opposite end of the pipe coupling; and
      iii) attaching a fitting at each end of the pipe coupling.

53. A method for performing one of the operations selected from the group consisting of joining two pipes, attaching a fitting to a pipe, and joining two fittings together, the method comprising:
   a) providing a pipe coupling according to claim 46; and
   b) performing one of the operations selected from the group consisting of:
      i) attaching a pipe at each end of the pipe coupling;
      ii) attaching a pipe at one end of the pipe coupling and a fitting at the opposite end of the pipe coupling; and
      iii) attaching a fitting at each end of the pipe coupling.

* * * * *